United States Patent Office 3,371,448
Patented Mar. 5, 1968

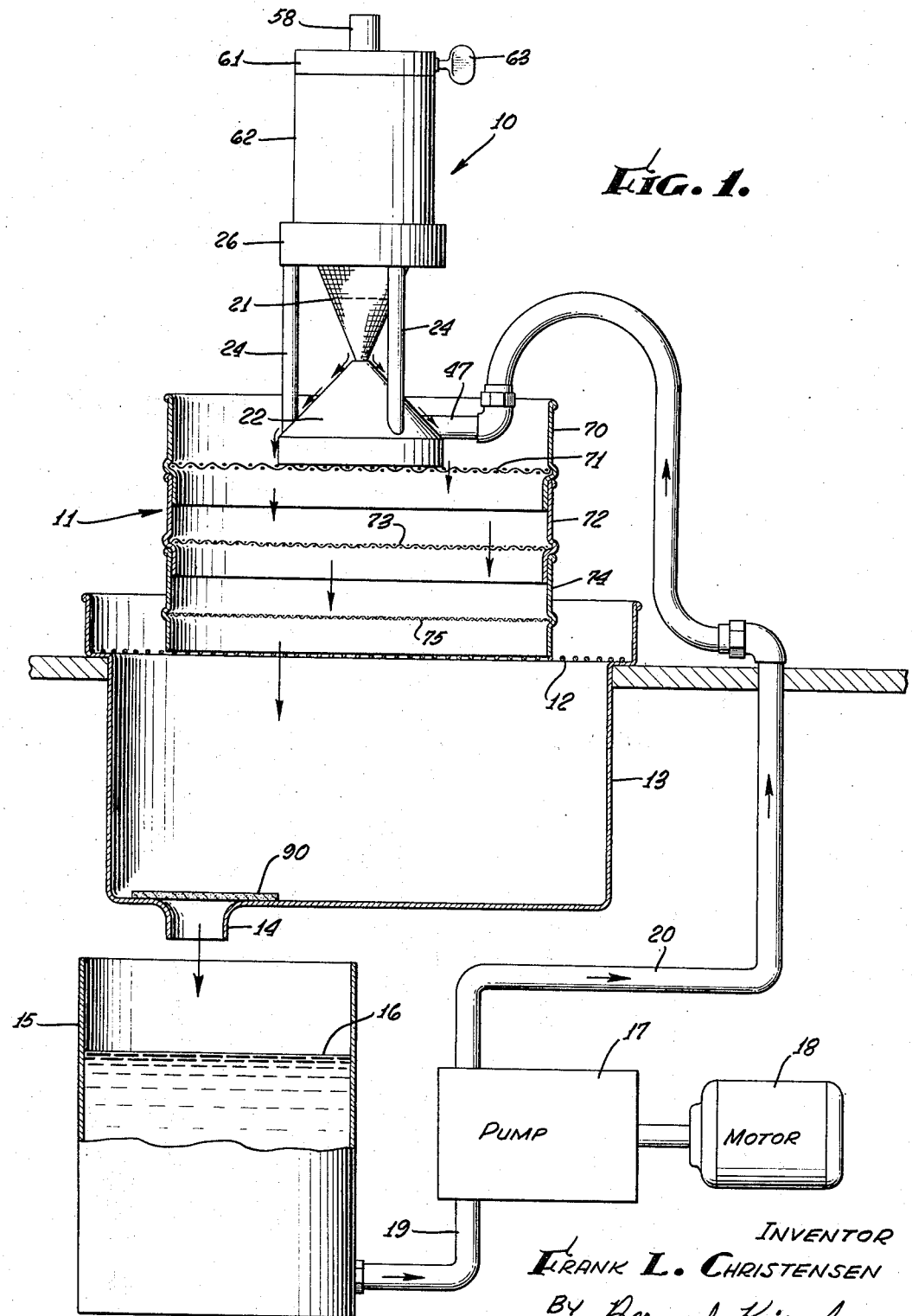

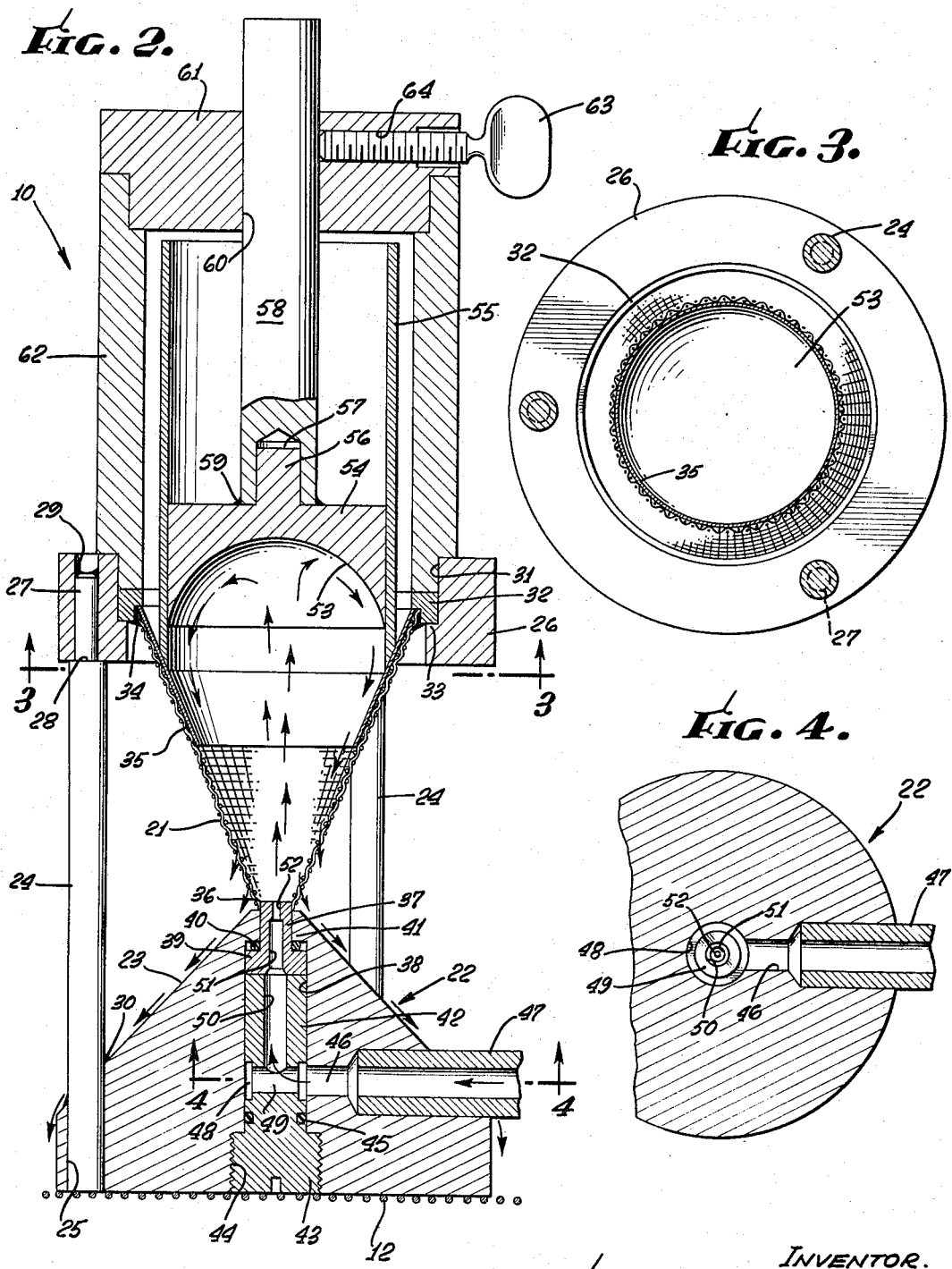

3,371,448
APPARATUS FOR SHAPING CRYSTALLINE CARBON BODIES
Frank L. Christensen, Salt Lake City, Utah, assignor to Christensen Diamond Products Company, Salt Lake City, Utah, a corporation of Utah
Filed Mar. 19, 1965, Ser. No. 441,238
8 Claims. (Cl. 51—163)

ABSTRACT OF THE DISCLOSURE

Apparatus for reshaping diamonds, in which fluid is jetted from a nozzle to carry diamonds upwardly and impact them against the generally spherical internal surface of an anvil, the diamonds dropping upon a downwardly tapering screen toward the nozzle for repeated upward impacting against the anvil, as well as against other diamonds within the screen, grits and powders resulting from the impacting action and fluid passing through the screen onto a downwardly diverging diverter.

---

The present invention relates to the shaping of diamonds and similar bodies of crystalline carbon.

Diamonds perform best as cutting tools when in a solid, blocky state. However, as a result of its use, a stone or diamond becomes abraded, cracked or badly fractured, rendering it less valuable for subsequent use as a cutting tool. Such used stones have been upgraded by restoring them to a solid, blocky state as a result of removing the highly friable fractured areas.

Heretofore, the reshaping of stones has required operation upon relatively large quantities in any one batch, and considerable time. In a typical case, a quantity of approximately 1500 carats of random size diamonds and an operating period of about 20 hours were necessary to properly recondition the diamonds. Grits and powders, including a large amount of micron powder, were produced, which were collected and separated, but a substantial quantity of the micron powder was not recovered.

The large carat weight of stones and the extensive operating times required for reconditioning them necessitated the maintenance of relatively large inventories of diamonds in the manufacture of cutting tools, with attendant economic disadvantages.

Accordingly, it is an object of the present invention to provide an improved apparatus for removing highly friable fractured areas of diamonds, and the like, and shaping the diamonds to a solid, blocky form.

Another object of the invention is to provide an apparatus for shaping used and other diamonds in a relatively short period and with a comparatively small quantity of diamonds in a batch, thereby enabling smaller diamond inventories to be maintained with a more rapid turnover.

A further object of the invention is to provide apparatus for shaping diamonds that conserves, protects and automatically separates immediately the various sizes of stone fragments produced during the shaping operation. Nearly 100% recovery of the grits and powders produced, including micron powders, is effected.

Yet another object of the invention is to provide apparatus for shaping diamonds, in which a high-velocity liquid is used for impacting the diamonds against a surface and against one another, and in which the liquid, grits and powders produced are rapidly exited from the region of operation to avoid interference with the shaping action.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIG. 1 is a somewhat diagrammatic side elevational view, with part shown in vertical section, of a system embodying a diamond impinger apparatus for converting diamonds to a desirable shape;

FIG. 2 is a vertical section, on an enlarged scale, through the diamond impinging portion of the apparatus;

FIG. 3 is a section taken along the line 3—3 on FIG. 2;

FIG. 4 is a section taken along the line 4—4 on FIG. 2.

The diamond impinger portion 10 of the system rests upon the uppermost of a plurality of stacked sieves 11 disposed upon a suitable support 12 in the upper portion of a receiving tank 13 that has an outlet 14 above a reservoir 15 adapted to contain a liquid 16. A pump 17 driven by a motor 18 draws the liquid through a suction line 19 and discharges it through a line 20 into the impinger apparatus 10, which carries the diamonds therein upwardly, as described hereinbelow, for removal of their highly friable and fractured areas, the diamonds being shaped remaining in the impinger apparatus, but the liquid and the grits and powders produced passing through a sieve screen 21 forming part of the impinger apparatus and down along a diverter 22 into the stacked screens 11.

The diamond impinger apparatus 10 is illustrated most clearly in FIGS. 2, 3 and 4. It includes the diverter or base 22 adapted to rest upon the support and screen 12, and which has an upwardly converging frusto-conical surface 23. A plurality of circumferentially spaced vertical studs or legs 24 are received within vertical bores 25 in the base and carry a supporting member 26 at their upper ends. As specifically illustrated, the upper portions 27 of the legs are of reduced diameter, providing upwardly facing shoulders 28 on which the supporting member 26 rests. The upper ends of the legs may be secured to the supporting member in any suitable manner, through use of brazing material 29, the lower portions of the legs 24 also being suitably secured to the diverter base 22, as by use of brazing material 30.

The supporting member 26 is in the form of a ring having an upper counterbore 31, in which another ring 32 is disposed, resting upon the base 33 of the counterbore. Suitably secured, as by means of solder 34, to the ring 32 is an inner imperforate deflector 35 of frusto-conical shape tapering or converging in a downward direction and disposed within the upper portion of the frusto-conical sieve screen 21 that extends substantially below the lower end of the imperforate deflector and which has a lower terminal portion 36 of relatively small diameter adjacent to the upper relatively small diameter end of the diverter or base 22, the lower end of the screen surrounding the upper end of a nozzle 37 that extends upwardly through and out of a vertical central passage 38 formed in the diverter.

The nozzle 37 has a lower flange 39 engaging a gasket or seal ring 40 bearing against a downwardly facing shoulder 41 of the diverter, the nozzle being held in an upward position, to clamp the gasket between the shoulder and flange, by a nozzle plug 42 extending upwardly from the lower end of the central bore 38 of the diverter and having a threaded head 43 threadedly received within a threaded counterbore 44 of the diverter. A suitable side seal ring 45 is mounted on the nozzle plug for sealing against the wall of the central bore 38 below a liquid inlet portion 46 leading to the plug. As disclosed, liquid from the pump 17 and passing through the discharge line 20 enters an inlet pipe 47 opening into the lateral inlet passage 46 in the diverter that opens into the central bore 38, the fluid flowing into a peripheral groove 48 in the nozzle plug that communicates with a transverse port 49 in the latter, this port communicating with a central plug passage 50, the upper end of which, in turn, communicates with a central nozzle passage 51. The upper end of the nozzle passage is of reduced diameter to provide an orifice 52 so as to discharge fluid vertically upwardly through the screen 21 and imperforate deflector 35. A suitable charge of diamonds (not shown) is placed within the frusto-conical sieve screen 21 and is driven upwardly by the fluid discharging from the orifice 52 at a desired velocity.

The diamonds or stones are driven upwardly by the liquid discharging through the orifice toward and against a concave or inner spherical surface 53 of an anvil 54 adjustably mounted within a cylinder or shield 55 that surrounds it, the lower end of the shield bearing upon the deflector 35 below the lower end of the anvil. The anvil 54 has a central vertical axis, its upper end being constituted as a pilot portion 56 located within a lower bore 57 in a stem 58 to which the anvil is secured, as by means of brazing material 59. The stem extends upwardly through a central hole 60 in a cover 61 piloted within the upper end of a chamber 62 that surrounds the cylinder or shield, the lower end of the chamber being piloted within the upper end of the supporting member 26 and bearing upon the ring 32 to which the deflector 35 and screen 21 are secured. The stem and anvil are held in a vertically adjusted position within the cylinder or shield by a clamp screw 63 threaded into a radial bore 64 in the cover and bearing against the periphery of the stem 58.

A suitable mass of diamonds to be reconditioned is placed in the frusto-conical screen 21. A suitable liquid, which may, for example, be water, water and a detergent, soluble oil, oil, or an emulsion of oil and water, is pumped into the diverter base 22 and up through the passages 50, 51 in the nozzle plug 42 and the nozzle 37, discharging upwardly from the nozzle orifice 52 and carrying the stones upwardly with it, impacting them against the spherical or concave surface 53 of the anvil, which may be made of a suitable material, such as tungsten carbide. The stones strike the anvil and also one another to break away their highly friable portions. The stones and grits and powders produced are carried outwardly and downwardly around the spherical surface 53 and downward along the tapered deflector 35 and the tapered screen 21 back toward the orifice 52. The grits, powders and liquid pass outwardly through the frusto-conical screen 21 onto the conical surface 23 of the diverter or base. However, the stones are too large in size to pass through the screen 21 and, when reaching the region of the high velocity jet discharging from the orifice 52, will be recarried thereby up toward the anvil 54 and the other stones in its upper portion, impacting against the spherical surface and the stones to remove other undesirable portions from each stone and shape it to the desirable form. In each upward and downward movement of each stone, it is carried upwardly toward the anvil 54 and in an outward and downward direction around the spherical surface 53, the portions of the stone broken away passing downwardly with it along the deflector 35 toward the frusto-conical sieve or screen 21, the additional grits and powders, accompanied by the liquid, passing through the screen and onto the diverter or base 22.

The liquid, grits and powder flow by gravity down along the diverter and into the uppermost sieve 70, the screen 71 of which has a relatively large mesh, so that only the larger size grits will remain thereon. The liquid and smaller size grits and powders drop into the sieve 72 therebelow which has a screen 73 of smaller mesh so as to retain smaller size grits. Grits capable of passing through the second screen 73 and powders, accompanied by the liquid, will pass downwardly into the next succeeding sieve 74 which has a screen 75 of still smaller mesh. Because of the progressively smaller size screens in the stack of sieves, the grits are progressively separated and classified according to sizes. As many sieves 11 as deemed necessary are used in the stack. For that matter, the lowermost screen or screens may be of a size to retain larger size powders. Finally, the micron powders will drop out through the lowermost screen 75 and through the support 12 into the receiving tank 13, which has a filter 90 at its outlet 14 through which the liquid will flow into the reservoir. The filter will prevent the micron powders from flowing out of the receiving tank, and such powders can also be removed, as by evaporating the liquid in which they are entrained.

The impinger apparatus 10 is capable of operating upon relatively small batches of stones and of reconditioning them to the desired solid, blocky shape in a relatively short period. As an example, from 50 to 200 carats of diamonds can be placed in the frusto-conical screen after lifting the cover 61, stem 58, anvil 54 and shield 55 out of the chamber 62, after which these parts are replaced. With a suitable liquid pressure supplied by the pump 17, which, for example, may be about 80 p.s.i., good reconditioning of the stones has been achieved in about 7 minutes. Settable sizes of stones have been recovered ranging from 91% to 95% of the original carat weight of the quantity placed in the apparatus. The recovered grits ranged from 2½% to 7½%, and the loss of material was less than 2% of the original weight of diamonds.

It is, accordingly, apparent that a compact and highly efficient apparatus has been provided which can reshape diamonds to a desirable condition through use of relatively small charges of diamonds and in a relatively rapid manner. Accordingly, by reducing considerably the quantity of diamonds that must be acted upon at any one time, and also the operating time, it is now possible to maintain inventories of diamonds at a relatively low level. The recoveries are also much higher than heretofore obtainable and such recoveries of the settable stones and of the grits and of powders are automatic, the classification occurring within the apparatus itself. The classification arrangement is such that it prevents plugging of the apparatus, so that the liquid can return to the reservoir 16 for repumping through the orifice 52.

I claim:

1. An apparatus for shaping diamonds and the like: an anvil having a generally spherical internal surface; a downwardly tapering deflector sieve below and substantially coaxial of said surface and with its upper portion opening toward said surface, said deflector, sieve being adapted to contain a mass of diamonds; a downwardly diverging diverter below said sieve and substantially coaxial thereof onto which substances passing through said sieve can drop for lateral outward deflection; and nozzle means in said diverter coaxial of said sieve and communicating with its lower portion for jetting a fluid upwardly against the diamonds in the lower portion of said sieve and impacting them against the central portion of said spherical surface, the diamonds, particles broken therefrom, and fluid passing from said central portion laterally toward said sieve and downwardly therealong with the diamonds returning toward said nozzle means, said fluid and at least some of said particles passing through said sieve and onto said diverter.

2. In apparatus for shaping diamonds and the like; an anvil having a generally spherical internal surface; a downwardly tapering deflector means below and substantially coaxial of said surface and with its upper portion opening toward said surface, said deflector means being adapted to contain a mass of diamonds; and nozzle means substantially coaxial of said deflector means and communicating with its lower portion for jetting a fluid upwardly against the diamonds in the lower portion of said deflector means and impacting them against the central portion of said spherical surface wherein said deflector means comprises a frusto-conical screen having its smaller lower end adjacent to and closed by said nozzle means and a frusto-conical deflector within the upper portion of said screen and having its smaller lower end terminating a substantial distance above said nozzle means.

3. In apparatus for shaping diamonds and the like: an anvil having a generally spherical internal surface; a downwardly tapering frusto-conical screen below and substantially coaxial of said surface with its upper portion opening toward said surface, a frusto-conical deflector within the upper portion of said screen and having its smaller lower end terminating a substantial distance above the lower end of said screen, said screen being adapted to contain a mass of diamonds; a downwardly diverging diverter below said screen and substantially coaxial thereof onto which substances passing through said screen can drop for lateral outward deflection; and nozzle means in said diverter coaxial of said screen and communicating with the lower portion of said screen for jetting a fluid upwardly against the diamonds in the lower portion of said screen and impacting them against the central portion of said spherical surface, the diamonds, particles broken therefrom, and fluid passing from said central portion laterally toward said deflector and downwardly therealong and along said screen therebelow with the diamonds returning toward said nozzle means and said fluid and at least some of said particles passing through said screen onto said diverter.

4. In apparatus for shaping diamonds and the like: an anvil having a generally spherical internal surface; a downwardly tapering deflector sieve below and substantially coaxial of said surface and with its upper portion opening toward said surface, said deflector sieve being adapted to contain a mass of diamonds; a downwardly diverging diverter below said sieve and substantially coaxial thereof onto which substances passing through said sieve can drop for lateral outward deflection; nozzle means in said diverter coaxial of said sieve and communicating with its lower portion for jetting a fluid upwardly against the diamonds in the lower portion of said sieve and impacting them against the central portion of said spherical surface, the diamonds, particles broken therefrom, and fluid passing from said central portion laterally toward said sieve and downwardly therealong with the diamonds returning toward said nozzle means, said fluid and at least some of said particles passing through said sieve and onto said diverter; and a plurality of sieves below said diverter to receive particles and fluid therefrom, said sieve decreasing progressively in mesh in a direction downwardly from said diverter.

5. In apparatus for shaping diamonds and the like: an anvil having a generally spherical internal suface; a downwardly tapering frusto-conical screen below and substantially coaxial of said surface with its upper portion opening toward said surface, a frusto-conical deflector within the upper portion of said screen and having its smaller lower end terminating a substantial distance above the lower end of said screen, said screen being adapted to contain a mass of diamonds; a downwardly diverging diverter below said screen and substantially coaxial thereof onto which substances passing through said screen can drop for lateral outward deflection; nozzle means in said diverter coaxial of said screen and communicating with the lower portion of said screen for jetting a fluid upwardly against the diamonds in the lower portion of said screen and impacting them against the central portion of said spherical surface, the diamonds, particles broken therefrom, and fluid passing from said central portion laterally toward said deflector and downwardly therealong and along said screen therebelow with the diamonds returning toward said nozzle means and said fluid and at least some of said particles passing through said screen onto said diverter; and a plurality of sieves below said diverter to receive particles and fluid therefrom, said sieves decreasing progressively in mesh in a downward direction from said diverter.

6. In a system for shaping diamonds and the like: reservoir means adapted to contain a liquid; a plurality of sieves above said reservoir means and decreasing progressively in mesh in a downward direction; means for supporting said sieves in stacked relation with respect to one another and above said reservoir; diamond shaping apparatus supported above said sieves, said apparatus comprising an upper anvil having a generally spherical internal surface, a downwardly tapering generally frusto-conical screen below and substantially coaxial of said surface and with its upper portion opening toward said surface, a generally frusto-conical deflector within the upper portion of said screen with its smaller end terminating a substantial distance above the lower end of said screen, a downwardly diverging diverter below said screen and substantially coaxial thereof onto which substances passing through said screen can drop for lateral outward deflection, nozzle means in said diverter coaxial of said screen and communicating with its lower portion; pump means connected to said reservoir and to said nozzle means for jetting a liquid from said nozzle means upwardly against the diamonds in the lower portion of said screen and impacting them against the central portion of said spherical surface, the diamonds, particles broken therefrom and liquid passing from said central portion laterally toward said deflector and downwardly therealong and along the lower portion of said screen, with the diamonds returning toward said nozzle means and said fluid and at least some of said particles passing through said screen and onto said diverter for downward passage through said sieves and to said reservoir whereby said sieves separate and progressively classify such particles.

7. In apparatus as defined in claim 1, wherein said sieve is unobstructed internally to permit contact between diamonds descending from said spherical surface and diamonds driven upwardly by the fluid jetting from said nozzle means.

8. In apparatus as defined in claim 3, wherein said screen and deflector are unobstructed internally to permit contact between diamonds descending from said spherical surface and diamonds driven upwardly by the fluid jetting from said nozzle means.

References Cited
UNITED STATES PATENTS

| | | | |
|---|---|---|---|
| 258,912 | 6/1882 | Goessling | 241—40 |
| 472,421 | 4/1892 | Young | 241—40 X |
| 661,969 | 11/1900 | Fuhr | 241—79 |
| 1,127,615 | 2/1915 | Gilligan | 241—40 |
| 1,325,676 | 12/1919 | McKelvey | 241—40 X |
| 1,847,009 | 2/1932 | Kollbohm | 241—40 |
| 2,148,448 | 2/1939 | Edwards | 241—5 |
| 2,400,382 | 5/1946 | Arnold | 241—79 X |
| 2,459,166 | 1/1949 | Hughes. | |

HAROLD D. WHITEHEAD, *Primary Examiner.*